(12) United States Patent
Schramm et al.

(10) Patent No.: US 6,870,644 B2
(45) Date of Patent: Mar. 22, 2005

(54) TONE DEPENDENT PLANE DEPENDENT ERROR DIFFUSION HALFTONING

(75) Inventors: Morgan Thomas Schramm, Portland, OR (US); Jay S. Gondek, Canas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/237,428

(22) Filed: Sep. 9, 2002

(65) Prior Publication Data

US 2003/0090728 A1 May 15, 2003

Related U.S. Application Data

(63) Continuation of application No. 09/307,064, filed on May 7, 1999, now Pat. No. 6,501,564.

(51) Int. Cl.[7] .............................................. G06K 15/00
(52) U.S. Cl. ....................... 358/3.05; 358/534; 358/1.9; 358/3.03; 382/252
(58) Field of Search ......................... 358/1.9, 534, 501, 358/3.01, 3.03, 3.04, 3.05; 382/162, 251, 252, 254, 270

(56) References Cited

U.S. PATENT DOCUMENTS

| | | | | |
|---|---|---|---|---|
| 5,313,287 A | | 5/1994 | Barton | 358/458 |
| 5,696,846 A | * | 12/1997 | Shimazaki | 382/254 |
| 5,737,453 A | | 4/1998 | Ostromoukhov | 382/275 |
| 5,757,976 A | | 5/1998 | Shu | 382/252 |
| 5,949,965 A | * | 9/1999 | Gondek | 358/1.9 |
| 6,144,775 A | * | 11/2000 | Williams et al. | 382/252 |
| 6,172,768 B1 | * | 1/2001 | Yamada et al. | 358/1.9 |

FOREIGN PATENT DOCUMENTS

| EP | 0732843 | 9/1996 |
|---|---|---|
| EP | 0887998 | 12/1998 |

OTHER PUBLICATIONS

J. Shu, "38.2: Adaptive Filtering For Error–Diffusion Quality Improvement", SID 95 Digest, pp. 833–835, 1995.

Reiner Eschbach, "Reduction Of Artifacts In Error Diffusion By Means Of Input–Dependent Weights", Journal of Electronic Imaging, Oct. 1993, vol. 2(4), pp. 352–358.

Reiner Eschbach et al, "Error–Diffusion Algorithm With Edge Enhancement", J. Opt. Soc. Am. A, vol. 8, No 12, Dec. 1991, 1991 Optical Society of America, pp. 1844–1850.

Zhigang Fan et al., "Edge Behavior Of Error Diffusion", Proceedings of the 1995 IEEE International Conference on Image Processing, vol. III, pp. 113–116, Washington, D.C., Oct. 1995.

(List continued on next page.)

*Primary Examiner*—Thomas D. Lee

(57) ABSTRACT

Tone dependent plane dependent error diffusion halftoning takes into account multiple color planes, such as cyan and magenta, when determining the placement of a dot in any of the color planes. The combined tones of the correlated color planes is used to determine the threshold levels against which the combined tones and the accumulated errors for the correlated color planes is compared. Further, tone dependent error weightings are determined based on the combined tones of the correlated color planes. The tone dependent error weightings are used to diffuse the final accumulated errors for each color plane. A prerendered mid-tone bitmap may be used to break up any structured patterns that occur in the mid-tones. Using this technique, printed dots of two or more colors are dispersed so as to avoid noticeable clumping of dots of two or more colors to provide a more uniform pattern and to avoid the unintentional overlapping of colors. This technique can be used to augment any existing error diffusion method.

21 Claims, 9 Drawing Sheets

OTHER PUBLICATIONS

Robert W. Floyd et al., "An Adaptive Algorithm For Spatial Greyscale", Proceedings of the S.I.D., vol. 17, No. 2, Second Quarter 1976, pp. 75–77.

Keith T. Knox et al., "Threshold Modulation In Error Diffusion", Journal of Electronic Imaging, Jul. 1993, vol. 2(3), pp. 185–192.

Bernd W. Kolpatzik, "Optimized Error Diffusion For Image Display", Journal of Electronic Imaging, Jul. 1992, vol. 1(3), pp. 277–292.

J. Sullivan et al., "Image Halftoning Using A Visual Model In Error Diffusion", J. Opt. Soc. Am. A/vol. 10, No. 8, Aug. 1993, pp. 1714–1724.

Ping Wah Wong, "Adaptive Error Diffusion And Its Application In Multiresolution Rendering", IEEE Transactions on image Processing, vol. 5, No. 7, Jul. 1996, pp. 1184–1196.

Ping Wah Wong, "Optimum Error Diffusion Kernel Design", SPIE vol. 3018, pp. 236–242.

Robert Ulichney, "Digital Hlalftoning", The MIT Press, Cambridge, Massachusetts, London, England, 1987 Massachusetts Institute of Technology.

* cited by examiner

| | | |
|---|---|---|
| magenta 33 | 33 | 33 |
| 33 | 33 | 33 |
| 33 | 33 | 33 |

| | | |
|---|---|---|
| 44 | 44 | 44 |
| cyan 44 | 44 | 44 |
| 44 | 44 | 44 |

| | | |
|---|---|---|
| LB | LB | LB |
| LB | LB | LB |
| Light Blue (LB) | LB | LB |

TONE DEPENDENT PLANE DEPENDENT ERROR DIFFUSION HALFTONING

RELATED APPLICATIONS

This is a continuation of application Ser. No. 09/307,064 filed on May 7, 1999 now U.S. Pat. No. 6,501,564.

FIELD OF THE INVENTION

The present invention relates to a technique for color image processing and, more particularly, to error diffusion halftoning which correlates dots printed from different color planes and tones to create a more visually pleasing combination of different color dots and superior dot placement.

BACKGROUND

Images, such as charts, drawings, and pictures, may be represented as a two-dimensional matrix of picture elements (pixels). The spatial resolution and tone level for each pixel are chosen to correspond to the particular output device used. For example, typical computer monitors display images at 75 dots per inch (DPI) and have 256 levels of intensity for each color. Such monitors use the additive primary colors, red, green, and blue (RGB), which can be combined to produce millions of colors and also black.

Typical hardcopy output devices, such as inkjet printers, are binary devices, meaning that for each pixel or possible dot location on the printed medium they can only print at two levels: on or off. Therefore, some means must be provided to convert the monitor-based version of the image (256 tone levels per color), or another version of the color image, to the binary version (2 levels per color). These conversion methods are commonly referred to as halftoning. Halftoning methods are described in the book Digital Halftoning, by Robert Ulichney, The MIT Press, 1987, incorporated herein by reference.

One major approach to halftoning is error diffusion. The decision about whether or not to print a dot is based not only on the "ideal" intensity (i.e., one of the 256 possible intensities) for that pixel, but on what has happened before for previously processed pixels.

It is assumed in the following explanation that there are 256 pixel intensities that range between 0 and 255. In conventional error diffusion, at each point where a dot may be printed, the original image pixel intensity between 0 to 255, plus accumulated error, is compared to a previously chosen threshold value. If the image pixel intensity is greater than the threshold value, a dot (255 intensity) is assigned to that pixel. If not, no dot (0 intensity) is assigned. In either case, the intensity difference between the actual dot value assigned (0 or 255) and the ideal image pixel intensity plus accumulated error for that point is derived, and this difference becomes an error term that is "diffused" to other subsequently processed pixels. In other words, the diffused error term is added to the image pixel intensity plus the accumulated error of other subsequently processed pixels, and this total resultant image pixel intensity is then compared against the error diffusion threshold to determine whether a dot should be printed. The parameters in error diffusion halftoning that have the most visual effects on the final outcome of the printed output are the thresholds, the error weightings and the direction of the error diffusion.

Typically, an error diffusion threshold value is static, e.g., 50 percent of the maximum theoretical image pixel intensity. For example, if there are 256 tone levels (0 and 255) per pixel, a level of 128 may be chosen as the threshold value. Improvements to the quality of the printed output may be achieved, however, by randomly varying the threshold value as described in Digital Halftoning, by Robert Ulichney, The MIT Press, 1987, page 265.

In addition, typical error diffusion techniques use constant weighting factors to compute the proportion of the error that is diffused to each surrounding pixel. A well known error diffusion technique is described by R. Floyd and L. Steinberg in the paper Adaptive Algorithm for Spatial Grey Scale, SID Int'l. Sym. Digest of Tech. Papers, pp. 36–37 (1975), incorporated herein by reference. The Floyd and Steinberg error diffusion technique diffuses the error into a set of four surrounding pixels. Error diffusion with higher than four terms can also be used. U.S. Pat. No. 5,313,287 to David Barton, assigned to the present assignee and incorporated herein by reference, discloses another error diffusion technique.

Another type of error diffusion method, known as tone dependent error diffusion, varies the error diffusion threshold value and/or the error weightings according to the tone or intensity of the pixel being processed. Tone dependent error diffusion is described in the articles "Reduction of Artifacts in Error Diffusion by Means of Input-Dependent Weights," by Eschbach, E., Journal of Electronic Imaging, vol. 2(4), October 1993, and "Adaptive Filtering for Error Diffusion Quality Improvement," by Shu, J., SID Digest of Technical Papers, May 1995, as well as U.S. Pat. Nos. 5,737,453 and 5,757,976, all of which are incorporated herein by reference. Tone dependent error diffusion techniques are typically monochromatic.

When printing a color image, dots for multiple colors, such as cyan, magenta, and yellow, are printed in various combinations to achieve the desired color tones to reproduce the original color image. Many known error diffusion methods operate on one color plane (e.g., cyan, magenta, or yellow) at a time. These types of error diffusion methods strive to generate a visually pleasing pattern of dots (i.e., dispersed dots) for each separate color, independent of the pattern of dots for the remaining colors. Due to random chance, these overlapping color dot patterns inevitably result in two or more dots of different colors overlapping or being adjacent to one another, as shown in FIG. 1, which is perceived by the human eye as a clumping of dots.

FIG. 1 illustrates an example of a prior art multi-colored dot pattern using magenta dots 4 and cyan dots 6. The overall tone is light blue. When the cyan and magenta planes overlap, non-pleasing dot patterns due to adjacent cyan and magenta dots (such as at location 7) can be formed due to random chance.

Other known error diffusion methods operate on multiple color planes at the same time, which is known as plane dependency, such as the method described in U.S. application Ser. No. 08/880,475, entitled "Correlating Cyan and Magenta Planes for Error Diffusion Halftoning" by Jay S. Gondek, filed Jun. 3, 1997, having the same assignee, and which is incorporated herein by reference. Multiple color planes, such as cyan and magenta, are correlated to create dot patterns that do not fall on top of one another up to a combined 100 percent fill. Consequently, the occurrence of darker "blue" dots (cyan overlapping magenta creates dark blue) is avoided, which also fills in white space that would otherwise contributed to the perception of graininess. Thus, a more visually pleasing patterning of dots is created.

FIG. 2 illustrates an example of a dot pattern of cyan and magenta dots printed using a plane dependent error diffusion method. As can be seen, FIG. 2 is an improvement over FIG. 1 because there are no adjacent or overlapping cyan and magenta dots.

However, as can be seen in FIG. 2, a drawback of plane dependent halftoning is that the relative spatial placement of the dots in light tones is not optimized. Consequently, in light or mid tones, patterns can develop in the printed output. These patterns occur because of the way the error can "cascade" through the image to produce curved lines of printed dots. These anomalies are often referred to as "worms" because they can resemble small thin worms in the image.

As discussed above, while tone dependent error diffusion may be used to generate a pleasing pattern of dots, tone dependent error diffusion is monochromatic. Consequently, the use of tone dependent error diffusion with a color image results in an image that, while each color may independently have a pleasing pattern, when combined the colors randomly overlap.

Accordingly, there is a need for a color halftoning method that provides a printed output with the plurality of colors that are correlated so as to produce uniform patterning without unintentionally overlap of the colors.

SUMMARY

The present invention provides a method and a system for processing an image composed of image pixels, each image pixel having a predetermined tone level. The method uses tone dependent plane dependent error diffusion halftoning to process the image for output on a digital output device, such as a printer. Tone dependent plane dependent error diffusion halftoning takes into account multiple color planes, such as cyan and magenta, when determining the placement of a dot in any of the color planes. The combined tone of the correlated color planes is used to determine the threshold levels against which the combined tone and the accumulated errors for the correlated color planes are compared. Further, tone dependent error weightings are determined based on the combined tones of the correlated color planes. The tone dependent error weightings are used to diffuse the final accumulated errors for each color plane. Using this technique, printed dots of two or more colors are dispersed so as to avoid noticeable clumping of dots to provide a more uniform pattern and to avoid the unintentional overlapping of colors.

The method determines whether to print zero dots, one dot of either correlated color plane, or two dots, for each pixel position. Two dots are printed if (1) the combined tones from the plane dependent colors are above a full intensity threshold (100 percent fill), i.e., the pixel has a tone value indicating that a dot must be printed; and (2) the combined tones and accumulated errors from the plane dependent colors are greater than a tone dependent threshold. The two dots that are printed are preferably not of the same color. One dot is printed if either (1) or (2) is true and no dots are printed if neither (1) nor (2) is true. Because the color planes are correlated, the printing of dots of the correlated colors has a reduced likelihood that the printed dots will unintentionally overlap.

Thus, the error diffusion takes into account the tone level of the pixel as well as multiple color planes when determining whether to print zero, one, or two dots to represent the pixel. This technique can be used to augment most existing error diffusion methods. In the preferred method, only correlation between the magenta and cyan color planes is performed, and no correlation with the yellow plane is performed. This is because the cyan and magenta planes are darker than the yellow, and adjacent or overlapping cyan and magenta dots are much more noticeable than a cyan or magenta dot adjacent to a yellow dot. However, correlation with three or more color planes may be performed using the techniques described herein.

BRIEF DESCRIPTION OF THE DRAWINGS

FIG. 6 illustrates a 3×3 block of pixels and their tone-values to be reproduced by halftoning.

FIG. 7 illustrates the 3×3 block of pixels in FIG. 6 but identifying the intensities of the cyan component of the tone values.

FIG. 8 illustrates the 3×3 block of pixels in FIG. 6 but identifying the intensities of the magenta component of the tone values.

DETAILED DESCRIPTION

Figure 1:
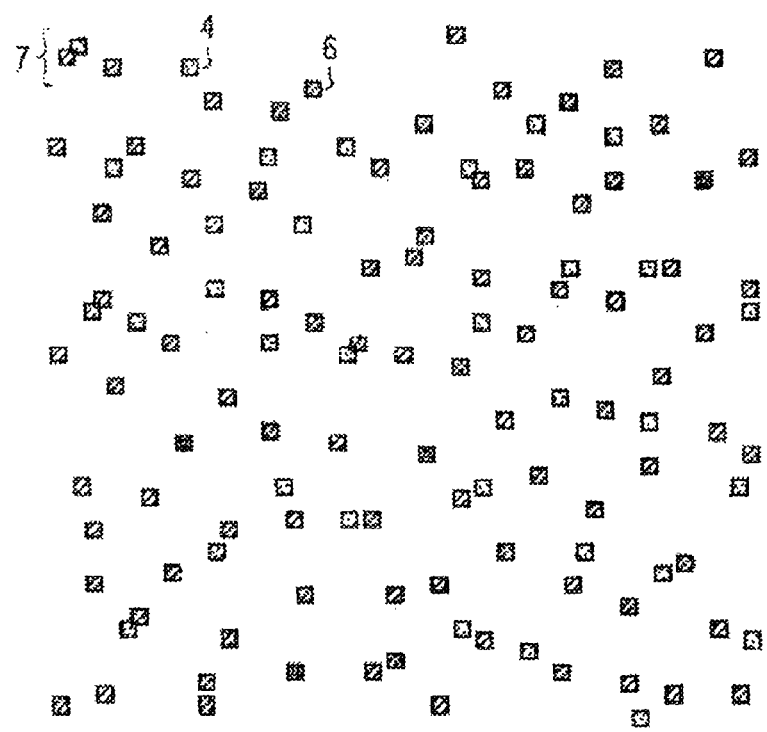
FIG. 1 illustrates a prior art dot pattern representing an arrangement of cyan and magenta dots.
Figure 2:
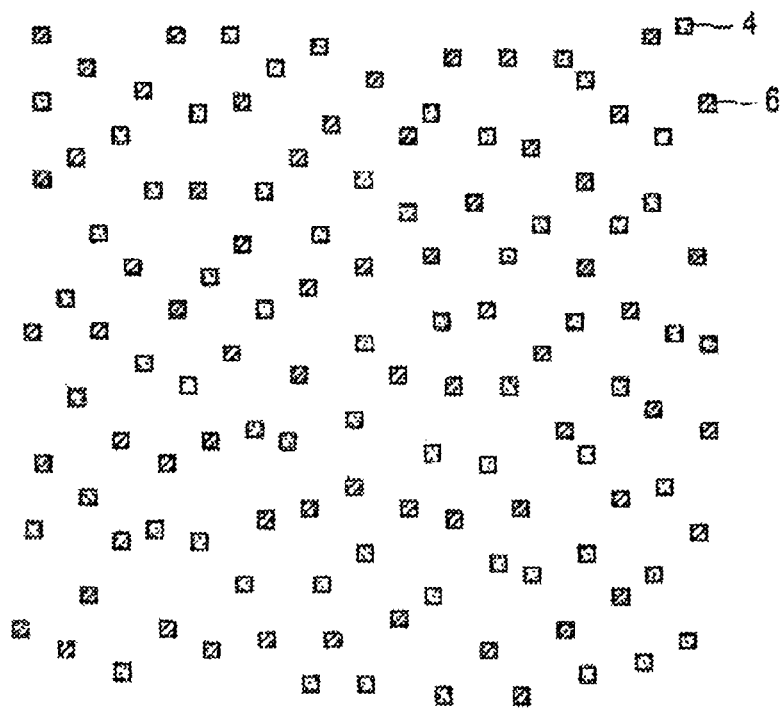
FIG. 2 illustrates a dot pattern representing a plane dependent halftoning arrangement of cyan and magenta dots.
Figure 3:
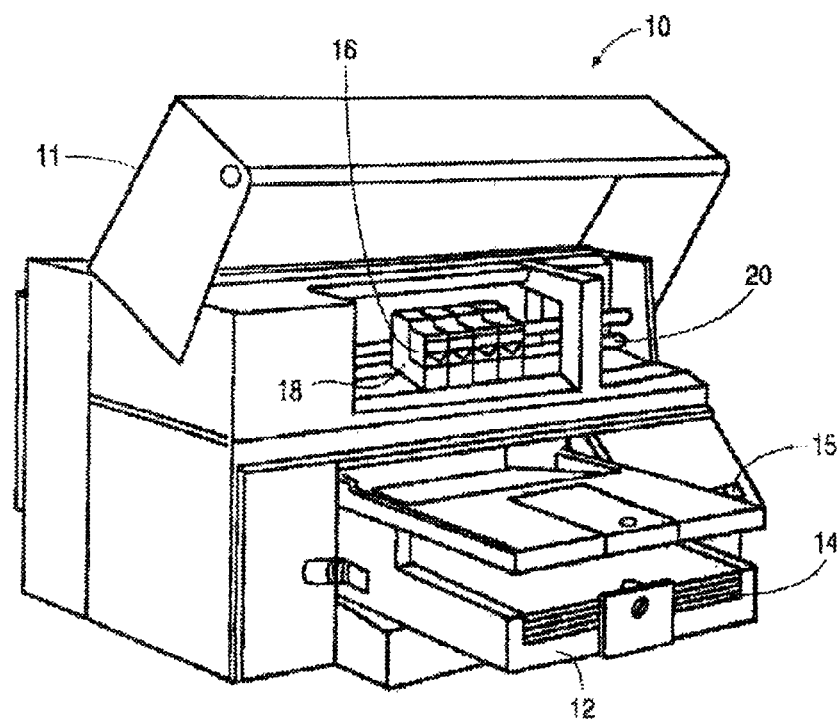
FIG. 3 illustrates a color inkjet printer which includes processing circuitry for performing all or part of the preferred error diffusion method.

FIG. 3 illustrates one type of color inkjet printer 10 which includes processing circuitry for performing all or part of the error diffusion method described herein. The color inkjet printer includes a cover 11, a paper tray 12 for holding virgin paper 14, an output tray 15 for receiving the printed pages, color print cartridges 16, and a scanning carriage 18 for sliding along a slide bar 20 while dots are being printed on the paper. The color print cartridges 16 include a multiple number of inks, for example cyan (C), magenta (M), yellow (Y), and black (K) ink.

Figure 4:
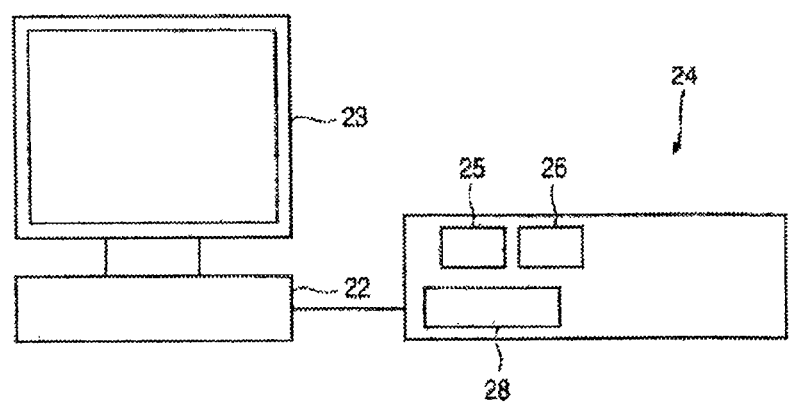
FIG. 4 illustrates a computer connected to an inkjet printer, where the computer or the printer or both carry out the error diffusion method in accordance with the present invention.

FIG. 4 is a schematic diagram of a printing system which includes a host computer 22, a monitor 23 (e.g., a CRT), and a printer 24. Printer 24 is a type of color inkjet printer which uses a tri-color (CMY) inkjet print cartridge 25, or a number of separate color inkjet print cartridges, along with a black inkjet print cartridge 26 in a scanning carriage. Printer 10 in FIG. 3 may instead be connected to computer 22. Printer 24 includes a printer controller 28 for controlling the printing of dots by print cartridges 25 and 26. The print cartridges may print at 300 dots-per-inch (DPI), 600 DPI, or any other resolution.

Figure 5:
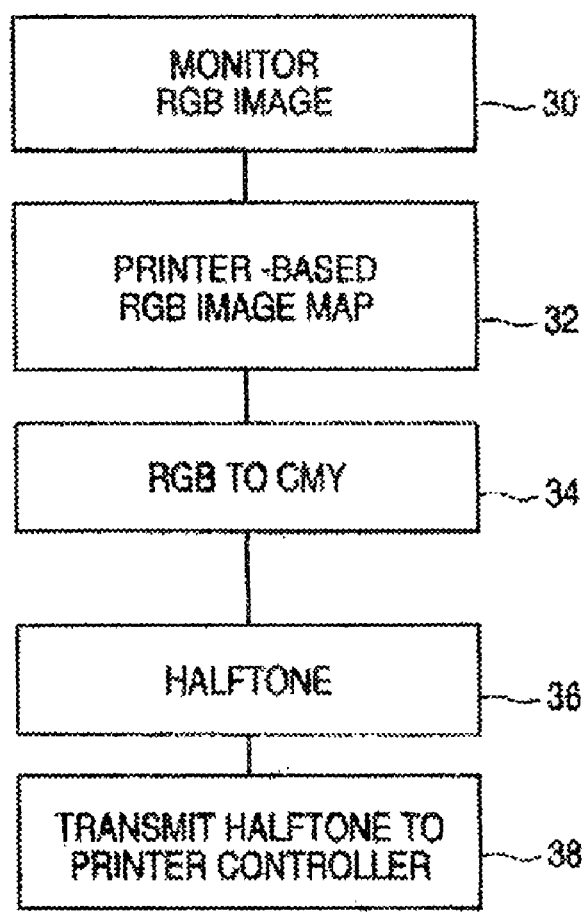
FIG. 5 illustrates the general method performed by the computer and printer of FIG. 4.

FIG. 5 illustrates the standard flow of image information from computer 22 to printer 24. An image is first created or introduced into the memory of computer 22. In order to be displayed on the computer monitor 23, this image is represented in additive RGB color space. Each pixel location on the screen can be illuminated in red, green, and blue at any one of 256 (0 and 255) levels of intensity or tones. It takes 8 bits to represent 256 levels ($2^8=256$). Each of the three primary colors require 8 bits; therefore, RGB color monitors are commonly referred to as producing 24-bit color (3×8= 24). This image is represented at the spatial resolution of the particular monitor. Typical monitors have 75 pixels per linear inch (75 DPI) in the vertical and horizontal directions.

At step 30, the 24-bit RGB color image is held in the memory of computer 22 so that it can be displayed on monitor 23.

At step 32, the image in memory is converted to a 24-bit RGB image at the resolution of the printer. Typical inkjet printers have a resolution of 300, 600 or 1200 dots per inch. Although the printer typically prints in CMY or CMYK subtractive colors, it is nevertheless convenient for image processing purposes at step 32 to consider the printer to be an RGB device. This is because later translating the color monitor RGB values directly to CMY will usually produce a colorimetric match. However, not all of the matching values will produce the same image quality. Some choices will contain more visual noise than others, while other choices may lead to undesirable discontinuities in the halftone transitions of an image.

At step 34, the printer RGB color image is converted into CMY color space using a look-up table or other conventional means of conversion. Of course, the RGB color image may be converted to CMYK color space in a similar manner.

In step 36, the CMY image is halftoned to convert the image from 3-plane (CMY), 8-bits per color to 3 plane binary color (on or off dots) at the DPI resolution of the printer. In other words, the color and tone (0 and 255) at each pixel location is converted into a pattern of on or off C, M, or Y dots (0 or 255 intensity) to be printed. This halftoned image (which may be a portion of the total image) is stored in a memory. Step 36 is described in greater detail later.

At step 38, the halftone image is transmitted to the printer, typically using efficient communication techniques such as using escape sequences like those identified in Hewlett-Packard Company's Printer Control Language (PCL). The image produced at step 36 includes all of the information about how many dots of each color are to be printed at each pixel location on the page and the locations of the dots. The printer controller 28 (FIG. 4) decides when these dots should be printed (i.e., in a single pass or in multiple passes). Because of the nature of inkjet printing, it is often beneficial to lay down dots in more than a single pass and to print individual passes in some kind of checkerboard or other sparse pattern. It is also beneficial to overlap passes with these interstitial patterns to hide artifacts that may occur between swaths. These procedures for determining in what pass and in what pattern the dots will be laid down are referred to as "print modes."

The halftoning step 36 is now described in detail with reference to the remaining figures. Thus, it is assumed that step 34 of FIG. 5 has been completed, and the step of halftoning must now be performed.

It will be understood that, depending on the printer, the functions discussed in relation to FIG. 5 can be performed by the host computer (programmed to carry out the processing functions) or by the printer. For example, in a "smart" printer, steps 32 through 38 could all be performed in the printer. On the other hand, to save memory costs in the printer, all or part of the functions 32 through 38 could be performed in the host computer.

Prior to the halftoning step, it is assumed that a separate image representation for the full color image is stored in a plane for each of the primary colors (C, M, or Y) to be printed. This is described with respect to FIGS. 6 to 8.

FIG. 6 illustrates a 3×3 block of pixels 40 in a full color image at the resolution of the computer monitor. Each of the pixels has a color intensity perceived as light blue (LB). The following assumes a range of tones per pixel from 0 and 255 to convey the full range of color intensities. FIGS. 7 and 8 illustrate the same 3×3 pixel block in FIG. 6 but show the cyan tone (FIG. 7) as 44 (out of 255) in each pixel region and the magenta tone (FIG. 8) as 33 in each pixel region needed to create an overall light blue intensity. The combination of the cyan and magenta tones in the two planes will produce the final desired color tone. The cyan and magenta tones are proportional to the number of dots in an area, where the intensity 255 is a complete fill of that area with cyan or magenta dots. The actual number of dots per original pixel location depends on the resolution (pixel density) of the original image and the resolution (dots per inch) of the printer.

Error diffusion attempts to recognize that for each point representing a potential dot position, there is usually a difference between what the hardcopy output device will print (e.g., a 0 or 255 tone cyan dot) and the actual image pixel tone (e.g., a 44 tone cyan dot). The only time there is no such error is if the image pixel tone is exactly 255 (a dot should be printed) or 0 (no dot should be printed). However, such circumstances are rare. Consequently, there is usually an error. If a dot is printed and the tone level is less than 255, the error is positive (i.e., more tone level has been printed than was actually called for by the image pixel). If no dot is printed and the image pixel tone is greater than zero, the error is negative (i.e., less tone level has been printed than was called for by the image pixel). Error diffusion attempts to spread this error to neighboring pixels.

The below example assumes that the light blue tone of FIG. 6 to be reproduced requires a combination of cyan and magenta dots, with the cyan and magenta tones shown in FIGS. 7 and 8. A different tone may also require the use of yellow dots or black dots in combination with the cyan and magenta dots.

The present method permits both cyan and magenta to be printed for each pixel being processed. Instead of a standard error diffusion technique evaluating whether to print a cyan dot based upon the accumulated error from printing previous cyan dots, the preferred error diffusion method determines whether no dot, a single dot of either cyan or magenta, or two dots consisting of both cyan and magenta should be printed based upon the combined error of the previous cyan and magenta dots. The present method involves determining both optimum thresholds and error weights based on the tone levels of the colors in each pixel. In one embodiment, a pre-rendered mid-tone bitmap is used to avoid noticeable structured patterns that may occur in the mid-tones. If used, the pre-rendered bitmap is linked to the tone dependent threshold values as will be described in more detail below.

The optimum tone dependent error diffusion thresholds and error weights may be determined manually by printing sets of patches for each tone over different parameter ranges and choosing the patch and corresponding parameters that appear the most visually pleasing. Other methods of generating tone dependent thresholds and error weights may be utilized as desired.

The present invention uses the combination of tone dependency and plane dependency to print no dots, one dot, or two dots for each pixel. Two dots are printed if (1) the combined tones from the plane dependent colors are above a full intensity threshold, i.e., 100 percent fill threshold; and (2) the combined tones and accumulated errors from the plane dependent colors are greater than a tone dependent threshold. The two dots that are printed are preferably not of the same color. Thus, for example, a cyan dot may be printed followed by a magenta dot (or vice versa) to form a dark blue dot. One dot is printed if either (1) or (2) is true and no dots are printed if neither (1) nor (2) are true. Using tone dependent error weightings, the accumulated errors for the plane dependent color are then dispersed.

Figure 9:
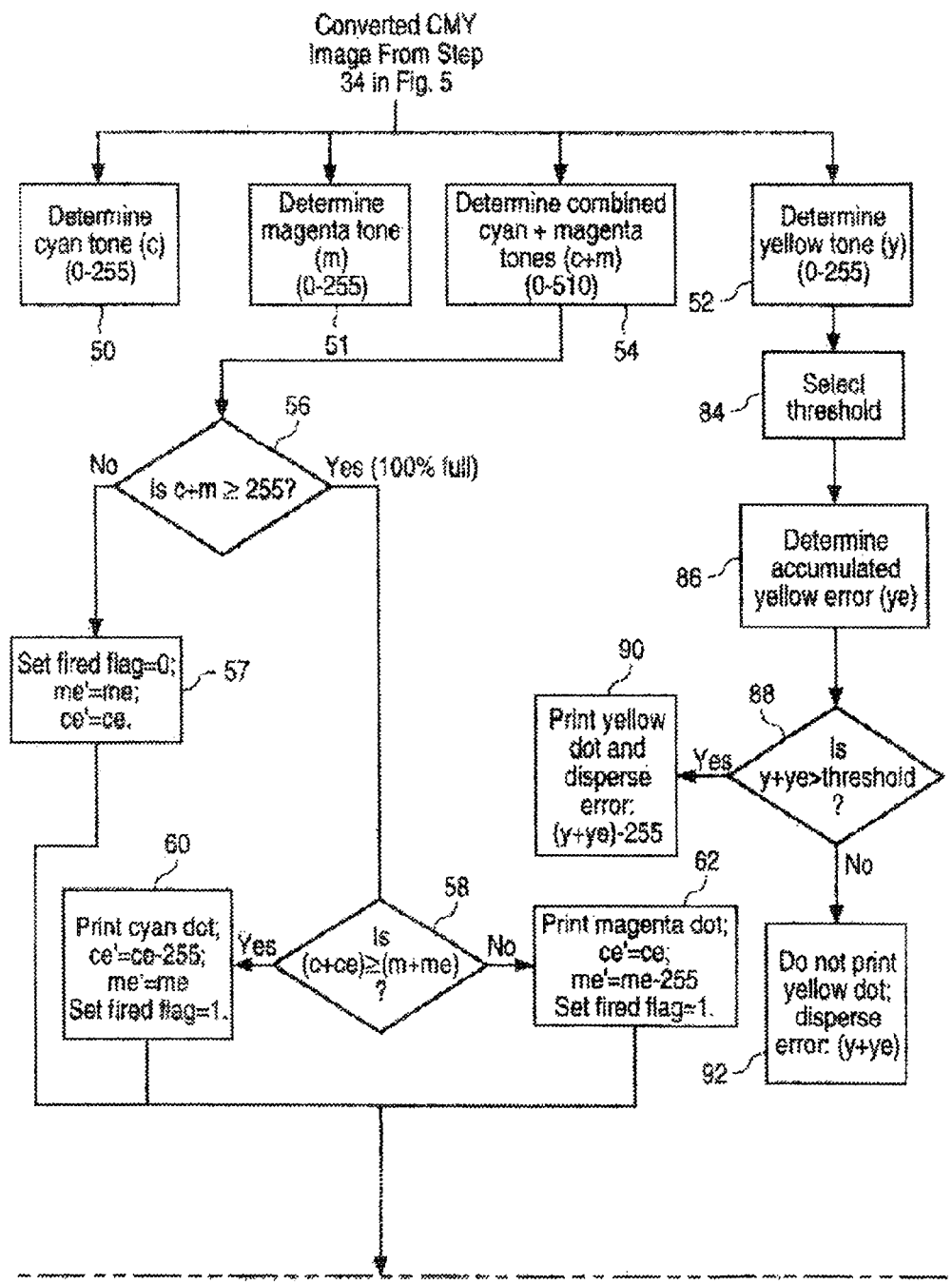
FIGS. 9 and 10 show a flow chart which describes a tone dependent plane dependent error diffusion halftoning method performed by a computer, a printer, or a combination of both, in accordance with the present invention.
Figure 10:
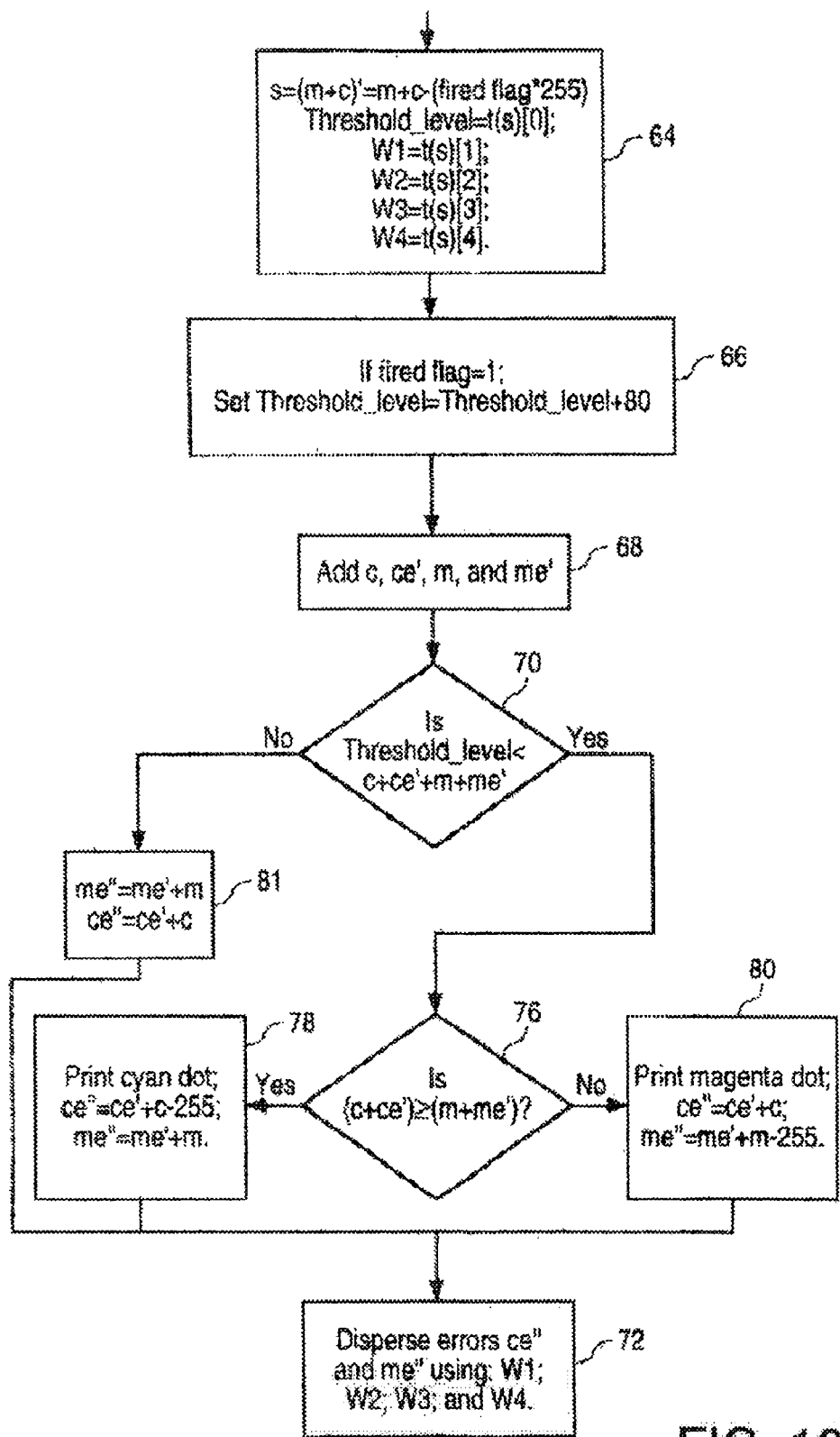

FIGS. 9 and 10 form a flowchart illustrating the basic steps in the tone dependent plane dependent error diffusion halftoning method in accordance with one embodiment of the present invention.

As shown in FIG. 9, the converted CMY image from step 34 is received by steps 50, 51, and 52. In steps 50, 51, and 52, the tone levels for the different colors are identified for the particular pixel being processed, e.g., the cyan, magenta, and yellow tones are determined. Steps 50 to 52 may be performed in parallel using conventional techniques. For example, the 8-bit RGB intensities for pixel being processed may be cross-referenced to the 0 and 255 tone levels for the CMY color planes using a look-up table or other conventional means. The steps for determining the CMY tones may be performed as part of step 34 in FIG. 5.

In step 54, which may also be performed in parallel with steps 50 to 52, the tone levels for the dependent color planes are summed. Thus, where the cyan and magenta planes are to be dependent, an input sum (c+m) of cyan and magenta tone levels is generated. Because the input sum (c+m) is obtained by adding the individual c and m tones, each of which ranges from 0 to 255, the range of the input sum (c+m) is 0 to 510.

In step 56, it is determined whether the input sum (c+m) for the pixel being processed is less than a 100 percent fill threshold, i.e., 255, which is the full intensity threshold. A pixel is 100 percent full, i.e., a dot will be printed for the pixel, when the pixel has a tone value of 255 or greater. Thus, if the input sum (c+m) is the full intensity threshold (255) or greater, a decision is made to print a dot of one of the plane dependent colors and the process flows to step 58.

In step 58, it is determined whether a cyan dot or a magenta dot should be printed by comparing the current total values for cyan and magenta, where the current total value for a color is the sum of the tone level and all the accumulated errors for that color at the pixel being processed. If the current total value for cyan (c+ce) is greater than or equal to the current total value for magenta (m+me), where ce and me are the respective accumulated errors for cyan and magenta from previously processed pixels, then a cyan dot is printed in step 60. The error, however, is not diffused at this point. Instead, because a cyan dot is printed in step 60, a modified accumulated error (ce') is generated as equal to the previous accumulated error (ce) minus 255. Because a magenta dot was not printed in step 60, the modified accumulated error for magenta (me') is the same as the previous accumulated error (me). A fired flag is set equal to 1, indicating that a first dot has been printed for the pixel.

On the other hand, if the total value for cyan (c+ce) is less than the total value for magenta (m+me), a magenta dot will be printed in step 62. Because a magenta dot is fired in step 62, a modified accumulated error (me') is produced for magenta as equal to the previous accumulated error (me) minus 255. Because a cyan dot was not printed in step 62, the modified accumulated error for cyan (ce') is equal to the previous accumulated error (ce). Again the fired flag is set equal to 1 indicating that a dot has been printed. Whether a cyan dot was printed in step 60 or a magenta dot was printed in step 62, the processing then flows to step 64 in FIG. 10.

If, in step 56, the input sum (c+m) is less than the 100 percent fill threshold (255), a decision is made not to print a dot at this point in the process. Because a dot has not been fired, in step 57 the fired flag is set to 0 and the modified accumulated errors for magenta (me') and cyan (ce') are defined as equal to the previously accumulated errors for magenta (me) and cyan (ce), respectively. The processing then flows to step 64 in FIG. 10.

As shown in FIG. 10, a modified input sum (m+c)' is generated in step 64. The modified input sum (m+c)' is equal to the original input sum (m+c) minus the product of the value of the fired flag and 255. Thus, if either cyan or magenta were printed in steps 60 or 62, the fired flag is 1 and the modified input sum (m+c)' is equal to the original input sum (m+c) minus 255, otherwise the modified input sum (m+c)' is equal to the original input sum (m+c). Consequently, whether a dot has already been printed or not, the modified input sum (m+c)' will range from 0 and 255.

The modified input sum (m+c)' is used to collect five values from a tone dependent look-up table in step 64. The tone dependent look-up table provides a tone dependent threshold level and four tone dependent error weights (W1, W2, W3, and W4), which are to be used later in the error dispersion described in more detail below.

In step 66 the threshold level is modified if the fired flag is equal to 1, i.e., either cyan or magenta dots were printed in steps 60 or 62, to make it more difficult to print another dot for the pixel. The threshold level is modified by increasing the threshold level by a predetermined number, e.g., 80, which was determined empirically. Of course, if desired, the threshold level need not be modified or may be modified by other predetermined amounts, or by a variable amount that is dependent on such factors as the size of the modified input sum (m+c)' and/or the size of accumulated errors ce' and me', as well as any other useful factor.

The tone levels and the modified accumulated errors for the plane dependent colors cyan and magenta are summed together to produce a modified total value sum (c+ce'+m+me') in step 68. In step 70, the modified total value sum (c+ce'+m+me') is compared to the tone dependent threshold level. If the modified total value sum (c+ce'+m+me') is less than the threshold level, no dot is printed at this point in the process and the process flows to error dispersement in step 72. If, however, the modified total value sum (c+ce'+m+me') is greater than the threshold level, a decision is made to print a dot and the process flows to step 76.

In step 76, the modified total value for cyan (c+ce'), which is the tone level of cyan plus the modified accumulated error for cyan, is compared to the modified total value for magenta (m+me'), which is the tone level for magenta plus the modified accumulated error for magenta. If the modified total value for cyan (c+ce') is greater than or equal to the modified total value for magenta (m+me'), a cyan dot is printed in step 78, otherwise, a magenta dot is printed in step 80. As shown in step 78, because a cyan dot is printed, the cyan accumulated error is again modified to produce a final dispersion error for cyan (ce") that is equal to the previous modified accumulated error (ce') plus the input tone (c) for cyan minus 255. The final dispersion error for magenta (me") is equal to the previous modified accumulated error (me') plus the input tone (m) for magenta. In step 80, because a magenta dot is printed, the final dispersion error for magenta (me") is generated as equal to the previous modified magenta error (me') plus the input tone (m) minus 255, while the final dispersion error for cyan (ce") is equal to the previous modified error (ce') plus the input tone (c). The process then diffuses the final dispersion errors in step 72.

Thus, a decision to print a dot is made at step 56 based on whether the tone level of the plane dependent colors is above a 100 percent fill threshold. After appropriately modifying the sum of the tones of the plane dependent colors, based on whether a dot of either color had been printed, a tone dependent threshold level is determined based on the modified input sum. Another decision to print a dot is made at step 70 based on whether the tone level of the plane dependent colors plus their accumulated errors is greater than the tone dependent threshold. Thus, steps 56 and 70 may decide to produce no dots, one dot, or two dots.

If two dots are printed, the same color will not be printed twice, because of the modification of the accumulated errors for magenta and cyan in steps 60 or 62. Thus, a magenta dot may be printed in step 62 followed by a cyan dot in step 78, or a cyan dot at step 60 followed by a magenta dot in step 80, but two cyan dots or two magenta dots will not be printed in the present embodiment. Overlapping cyan and magenta dots produce a dark blue dot, which may be appropriate when the intensity at a particular pixel is high. It should be understood that while the two dots are described as overlapping, it is possible that the dots will not completely overlap due to the continuous scanning of the print cartridges.

If, in step 70, the modified total value sum (c+ce'+m+me') is less than the threshold level, a dot is not printed at this point in the process. Thus, the pixel may be represented with no dots or only one dot if a dot was printed in steps 60 or 62, i.e., the pixel is 100 percent full. Because a dot has not been printed, in step 81 the values of the final dispersion errors for cyan (ce") and magenta (me") are defined as equal to the modified accumulated errors plus the input tones for cyan (ce'+c) and magenta (me'+m), respectively. The process then flows to step 72.

In step 72, the final dispersion errors for cyan (ce") and magenta (me") from steps 78, 80, or 81 are multiplied by the values of the tone dependent error weightings W1, W2, W3, and W4 determined in step 64. The weighted errors for cyan and magenta are then diffused to nearby pixels as shown in FIG. 11.

Figure 11:
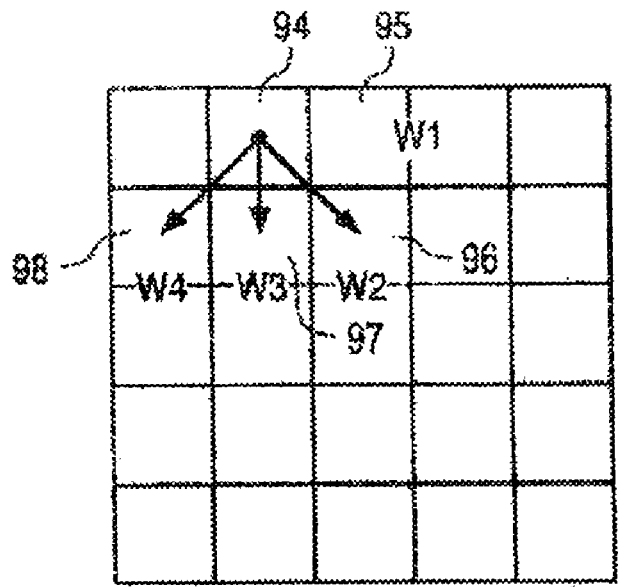
FIG. 11 illustrates dot positions and the portions of error diffused to adjacent dot positions.

In accordance with one embodiment of the present invention, a four-term error diffusion is used, as shown in FIG. 11. Thus, the final dispersion error derived from the current pixel being processed (e.g., pixel 94) is diffused to the subsequent horizontal pixel 95 and to the pixels in the next row, i.e., pixels 96, 97, and 98. The proportion of the error diffused to each of these adjacent pixels is determined using the tone dependent error weightings W1, W2, W3, and W4. The determination of zero, one, or two dots are printed for the subsequent pixel positions 95 to 98 will then be based on the desired tone levels for those pixels and the dispersion errors from pixel 94 and any accumulated dispersion errors from other pixels.

In the preferred embodiment, after each row of the image is processed, the direction of processing is reversed such that the error diffusion technique uses a serpentine processing system. Accordingly, the mirror image of FIG. 11 is used when the direction of processing is reversed. A two pass serpentine processing system or a non-serpentine processing system may also be used, if desired.

The determination for printing a yellow dot may be performed in parallel with the steps for printing the cyan and magenta dots. Correlating the yellow plane with the cyan and magenta planes provides little benefit because the cyan and magenta dots are darker than the yellow dots. The determination for printing a yellow dot uses the error diffusion technique described with respect to FIG. 11 and includes the steps shown in FIG. 9 as steps 84, 86, 88, 90, and 92. Black likewise may be halftoned separately from cyan and magenta where the black dot is a different size than that of the cyan or magenta dots. The same tone dependent table used in step 64 may be used independently on the yellow plane (at stage 84) or on a black plane by substituting the single values of the yellow or black plane for the modified input sum (m+c)'. If desired, the yellow plane and/or the black plane may be correlated with cyan and magenta planes by scaling the method described in FIGS. 9 and 10, for example, in products that use a black dot that is the same size as the cyan and magenta dots.

In pseudo-code, the tone dependent plane dependent error diffusion halftoning method is as follows:

```
m= current input value for magenta
c= current input value for cyan
c_total= c + accumulated error for cyan;
m_total= m + accumulated error for magenta;
Input_sum = m + c:
Fired = 0;
    if (Input_sum >= 255.0) { //check the sum, if it
is above 255 fire something!
        Fired = 1;
        if (m_total > c_total)
        {
            Fire magenta dot
            m_total = m_total -255;
        }
        else
        {
            Fire a Cyan dot
            c_total = c_total - 255;
        }
    } /// end sum> 255
    // at this point you may have fired one dot
    Input_sum=Input-sum - (FIRED*255);// if you have
fired a dot, modify your sum
    Threshold_level = t[Input_sum] [0]; // use the
tone dependent table
    Weight1      = t [Input_sum] [1];
    Weight2      = t [Input_sum] [2];
    Weight3      = t [Input_sum] [3];
    Weight4      = t [Input_sum] [4];
    if (fired) // if you already fired, make it harder
to fire again
    {
        Threshold_level = Threshold_level+80;
    }
    fired = 0;
    modified_sum= c_total+m_total;
    if (Threshold_level< Modified_sum // check to see
which plane has the highest value and fire it
    {
        if (m_total > c_total)
            Fire Magenta;
        Else
            Fire Cyan;
    }
```

Calculate Error for Magenta and distribute using W1, W2, W3, W4

Calculate Error for Cyan and distribute using W1, W2, W3, W4

Using the above error diffusion process combines plane dependency with tone dependency to create a color error diffusion halftoning method that produces images with superior dot placement and uniform patterning.

In another embodiment of the present invention, the plane dependent tone dependent error diffusion halftoning method includes the use of a prerendered bitmap for the mid-tones, i.e., approximately 50 percent tones. Error diffusion sometimes generates structured patterns in the image in the mid-tones. The prerendered 50 percent bitmap is used to break up visual artifacts in the mid-tones.

To employ the prerendered 50 percent bitmap, the error diffusion process determines if the modified total value sum (c+ce'+m+me') falls within a mid-tone range, and if so a bitmap is employed to decide whether to print a dot. The position of the pixel is compared to the bitmap, and if the bitmap has a value of 1, a dot is printed, otherwise the dot is not printed. If the modified total value sum (c+ce'+m+me') is greater than the mid-tone range, a dot is printed and if the modified total value sum (c+ce'+m+me') is less than the mid-tone range, a dot is not printed.

Figure 12:
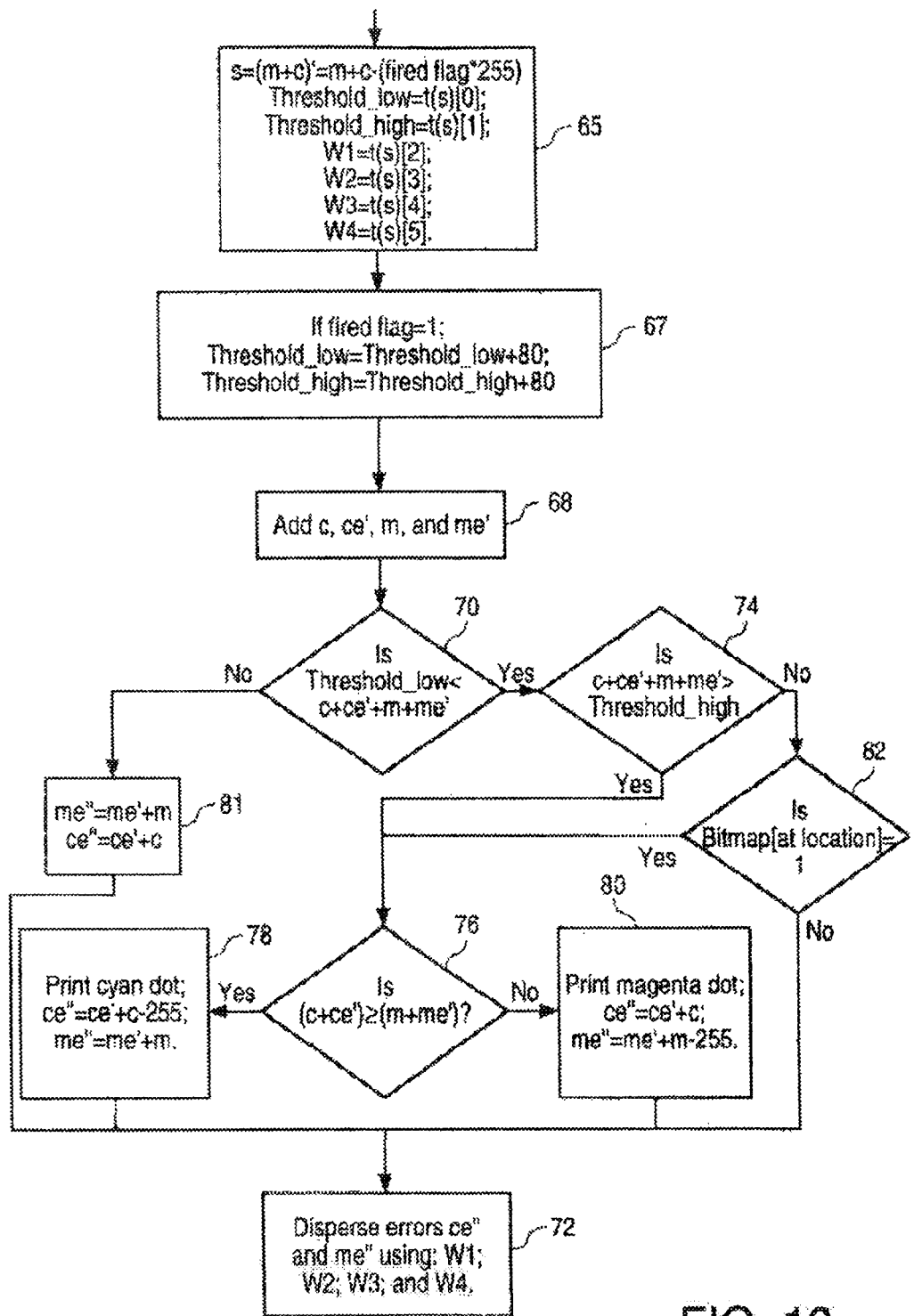
FIG. 12 is similar to FIG. 10 and shows another embodiment of tone dependent plane dependent error diffusion halftoning in which a prerendered mid-tone bitmap is used to avoid visual artifacts in the mid-tone range.

The plane dependent tone dependent error diffusion process with the use of a prerendered 50 percent bitmap is shown in FIG. 12. FIG. 12 follows FIG. 9, and is similar to FIG. 10, like designated steps being the same.

As shown in FIG. 12, a modified input sum (m+c)' is generated in step 65 in the same manner as step 64, shown in FIG. 10. The modified input sum (m+c)' is then used to collect six values from a tone dependent look-up table. The tone dependent look-up table provides two threshold levels, a low threshold (threshold_low) and a high threshold (threshold_high), and the four error weights (W1, W2, W3, and W4).

An example of a tone dependent threshold look-up table is attached hereto as Appendix A, where the tone level is the "gray" level, the upper threshold is "$t_u$" and the lower threshold is "$t_l$". The tone dependent threshold look-up table of Appendix A may be used to provide a single threshold level, as discussed in reference to FIG. 10, by using, for example, either the upper threshold, the lower threshold, or the average of the upper and lower thresholds.

A tone dependent error weighting look-up table is attached hereto as Appendix B, where the tone level is the "gray" level, w[0,1] represents pixel 95 in FIG. 11, w[1-1] represents pixel 98 in FIG. 11, w[1,0] represents pixel 97 in FIG. 11, and w[1,1] represents pixel 96 in FIG. 11. It should be understood, of course that the tone dependent threshold look-up table of Appendix A and the tone dependent error weighting table of Appendix B may be combined into one table.

In step 67, both the low and high threshold levels are modified if the fired flag is equal to 1, similar to step 66 shown in FIG. 10.

The modified total value sum (c+ce'+m+me') is generated in step 68 and in step 71, the modified total value sum (c+ce'+m+me') is compared to the low threshold. If the modified total value sum (c+ce'+m+me') is less than the low threshold, no dots are printed and the process flows to error dispersement in step 72 via step 81. If, however, the modified total value sum (c+ce'+m+me') is greater than the low threshold, the modified total value sum (c+ce'+m+me') is compared to the high threshold in step 74. If the modified total value sum (c+ce'+m+me') is greater than the high threshold, the process goes to step 76, which is described above in reference to FIG. 10.

If, in step 74, the modified total value sum (c+ce'+m+me') is not greater than the high threshold, and, thus, the modified total value sum (c+ce'+m+me') is in a mid tone range, i.e., between the low threshold and the high threshold, step 82 uses a prerendered mid-tone bitmap to determine if a dot should be printed. If the bitmap has a value of 1 at the pixel location a dot is printed and step 76 is used to determine whether to print a cyan or magenta dot. On the other hand, if at the pixel location the value of the bitmap is 0, no dot is printed and the process then flows to step 72.

Figure 13:
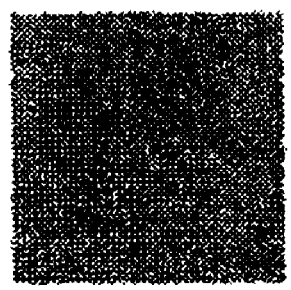
FIG. 13 is a graphical representation of one embodiment of a prerendered mid-tone bitmap that may be used in the method of FIG. 12.

The printed image of a useful prerendered mid-tone bitmap is shown as FIG. 13. The bitmap of FIG. 13 was generated using a direct binary search method as is well known to those of ordinary skill in the art. The bitmap shown in FIG. 13 may be tiled as necessary to cover the entire image being printed. Of course, if desired, prerendered mid-tone bitmaps other than the one shown in FIG. 13 may be used. In addition, if desired, a screening processes using a predetermined matrix of threshold values may be used instead of the prerendered mid-tone bitmap. Screening is well known to those of ordinary skill in the art.

Thus, steps 71 and 74 determine if the modified total value sum (c+ce'+m+me') falls within the mid-tone range, i.e., between the low and high thresholds, or above or below that range. While FIG. 12 shows this process occurring in two steps, i.e., steps 71 and 74, it should be understood that this determination may be done in one step and/or in any order.

In pseudo-code, the above process is as follows:

```
m= current input value for magenta
c= current input value for cyan
c_total= c + accumulated error for cyan;
m_total= m + accumulated error for magenta;
Input_sum = m + c:
Fired = 0;
    if (Input_sum >= 255.0) { //check the sum, if it
is above 255 fire something!
    Fired = 1;
    if (m_total > c_total)
    {
        Fire magenta dot
        m_total = m_total -255;
    }
    else
    {
        Fire a Cyan dot
        c_total = c_total - 255;
    }
} //// end sum> 255
// at this point you may have fired one dot
    Input_sum=Input_sum - (FIRED*255);// if you have
fired a dot, modify your sum
    Threshold_low   = t[Input_sum] [0]; // use the
tone dependent table
    Threshold_high  = t[Input_sum] [1];
    Weight1         = t [Input_sum] [2];
    Weight2         = t [Input_sum] [3];
    Weight3         = t [Input_sum] [4];
    Weight4         = t [Input_sum] [5];
    if (fired) // if you already fired, make it harder
to fire again
    {
        Threshold_low = Threshold_low+80;
        Threshold_high = Threshold_high+80;
    }
```

```
        fired = 0;
        modified_sum= c_total+m_total;
        if (Threshold_low< Modified_sum < Threshold_high)
// use bitmap
        {
            if (mid_tone_bitmap [at current location} ==
1)
                fired =1;
        }
        else if (sum > T1)
            fired =1;
        if (fired) // check to see which plane has the
highest value and fire it
        {
            if (m_total > c_total)
                Fire Magenta;
            Else
                Fire Cyan;
        }
```

Calculate Error for Magenta and distribute using W1, W2, W3, W4

Calculate Error for Cyan and distribute using W1, W2, W3, W4

It should be understood that while the present invention is described with reference to cyan, magenta and yellow, the present invention may use any number or color of inks. Thus, the tone to be reproduced may be created by a combination of additional planes such as light cyan, light magenta, dark cyan, and dark magenta, in addition to medium cyan and medium magenta. Some printers use the color planes cyan, magenta, yellow, orange, green, and black. The invention may be applied to a combination of all of these planes to reduce the likelihood that adjacent dots within a group of colors are printed and to help eliminate structured patterns.

In a preferred embodiment, the look-up tables and method for controlling the error diffusion process are provided on a computer readable medium, such as a microdiskette or floppy diskette as a printer driver. This printer driver is then installed into the computer, such as computer 22 in FIG. 4, so that the program is installed in the computer's RAM. Such a program may be also installed in the printer and, in one embodiment, installed in firmware within the printer. This program would depend on the print mode or printhead parameters as well as other factors. All logic functions may be implemented in hardware or software. If hardware is used, the various table values would be available to the circuitry implementing the halftone method via bus lines. The method may also be carried out by an ASIC, which controls the timing and transfer of data to the various logic devices and look-up tables as well as to and from the image map, as would be understood by those skilled in the art after reading this disclosure.

Figure 14:
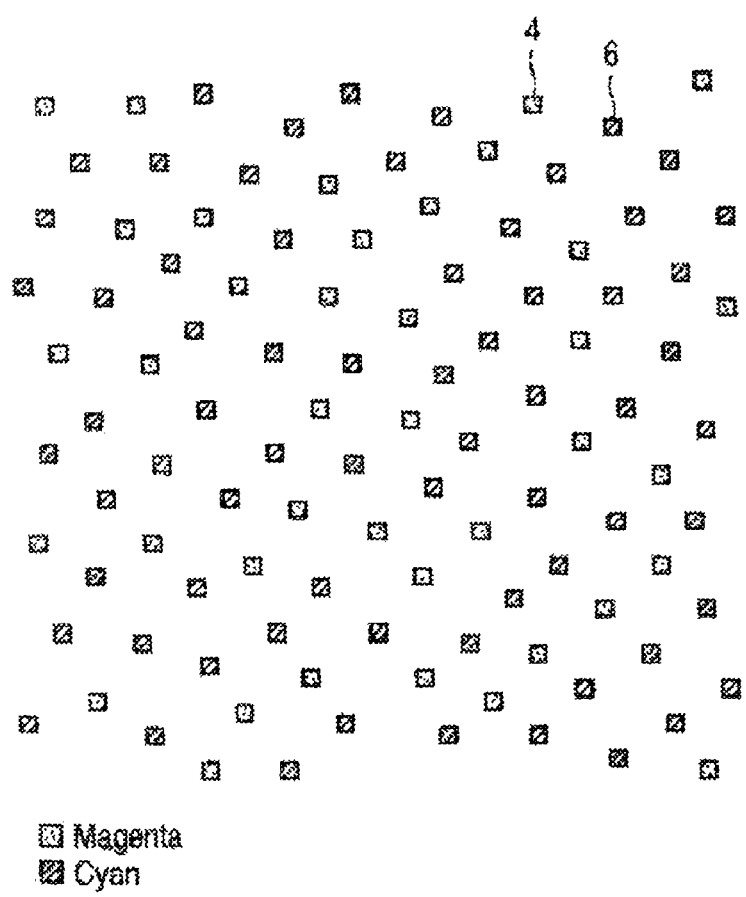
FIG. 14 is an example of a dot pattern of cyan and magenta dots printed using the error diffusion method of the present invention to be contrasted with the dot patterns in FIGS. 1 and 2 for generating the same light blue tone value.

FIG. 14 is an example of a light blue tone printed using a combination of cyan dots 6 and magenta dots 4 in accordance to the present invention to obtain the benefits of plane dependency and the superior dot placement of the tone dependent parameters.

While the preferred embodiment requires an extra look-up table and a few more operations, making it slightly more computationally complex than previous halftoning methods, the overall performance is only slightly slower than other error diffusion methods for halftoning. The benefit in the superior dot distribution is worth the added complexity.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of color halftoning, the method comprising:

performing tone dependent error diffusion with a plurality of colors correlated to determine whether to print no dots, whether to print one dot of either a first color ink or a second color ink, and whether to print two dots including one dot of the first color ink and one dot of the second color ink in approximately the same position; and correlating printing of dots of a first color with dots of a second color to reduce a likelihood that printed dots of the first color will unintentionally overlap printed dots of the second color, wherein one dot is printed if either a combined tone from the first color and the second color is greater than a full intensity threshold for a pixel or the combined tone and an accumulated error from the first color and the second color is greater than a tone dependant threshold level.

2. The method of claim 1, wherein performing tone dependent error diffusion with a plurality of colors correlated comprises:

performing error diffusion with the plurality of colors correlated to determine whether to print a dot of a first color ink, a dot of a second color ink, or no dot in approximately one pixel position;

performing tone dependent error diffusion with the plurality of colors correlated to determine to print a dot of a first color ink, a dot of a second color ink, or no dot in approximately one pixel position.

3. The method of claim 2, wherein performing error diffusion and performing tone dependent error diffusion comprises:

(a) determining a tone in the pixel to be reproduced using at least two including the first color and the second color;

(b) identifying a tone of the first color in the pixel to be reproduced;

(c) identifying a tone of the second color in the pixel to be reproduced;

(d) summing the tone of the first color and the tone of the second color to generate an input sum;

(e) determining whether the input sum is greater than the full intensity threshold for the pixel and, if so, printing a dot of either the first color the second color;

(f) generating a modified input sum by subtracting the full intensity threshold from the input sum if a dot of one of the first color or the second color was printed;

(g) determining the tone dependent threshold level based on the modified input sum; and (h) determining whether to print a dot of the first color ink or the second color ink based on the tone dependent threshold level.

4. The method of claim 3 wherein the tone of the first color and a tone of the second color each has 256 levels ranging between 0 to 255, and wherein the full intensity threshold is at least 255.

5. The method of claim 3 wherein if it is determined in step (e) that the input sum is less than the full intensity threshold for the pixel, the tone dependent threshold level is determined based on the input sum.

6. The method of claim 3, further comprising:
accumulating the first error value signifying an error in the tone between printed dots of the first color in nearby pixels and the tone of the first color in the pixel; and
accumulating a second error value signifying on error in the tone between printed dots of the second color in the nearby pixels and the tone of the second color in the pixel;
wherein determining whether the input sum is greater than the full intensity threshold for the pixel and, if so, printing a dot of either the first color or the second color further comprises:
determining whether the tone of the first color plus the first error value is greater than the tone of the second color plus the second error value and, if so, printing the dot of the first color ink and, if not, printing the dot of the second color ink.

7. The method of claim 3, wherein determining the tone dependent threshold level based on the modified input sum comprises indexing at least one look-up table with the modified input sum and outputting by the at least one look-up table a threshold level, the method further comprising:
generating a modified first error value and a modified second error value based on the first error value and the second error value and whether a dot of the first color ink or the second color ink has already been printed;
summing the tone of the first color, the modified first error value, the tone of the second color, and the modified second error value to produce a modified total value sum; and
determining whether the modified total value sum is greater than the threshold level and if so, printing a dot of the first color ink or the second color ink.

8. The method of claim 7, further comprising raising the threshold level prior to determining whether the modified total value sum value is greater than the threshold level if a dot of the first color ink or the second color ink has already been printed.

9. The method of claim 7, wherein determining whether the in modified total value sum is greater than the threshold and if so, printing a dot of the first color ink or the second color ink further comprises determining whether the tone of the first color plus the modified first error value is greater than the tone of the second color plus the modified second error value and, if so, printing a dot of the first color ink and if not, printing a dot of the second color ink.

10. The method of claim 3, further comprising:
(i) determining at least two tone dependent error weightings based on the modified input sum;
(j) determining a first dispersion error value for the first color and a second dispersion error value for the second color;
(k) accumulating a first error value signifying an error in the tone between printed dots of the first color in nearby pixels and the tone of the first color in the pixel;
(l) accumulating a second error value signifying an error in the tone between printed dots of the second color in the nearby pixels and the tone of the second color in the pixel;
(m) generating a first dispersion error value and a second dispersion error value based on the first error value and the second error value and the tone of the first color and the tone of the second color and whether a dot of the first color ink or the second color in has been printed; and
(n) diffusing the first dispersion error value and the second dispersion error value using the at least two tone dependent error weightings.

11. The method of claim 10, wherein four error weightings are determined based on the modified input sum by indexing at least one look-up table and the first dispersion error value and the second dispersion error value are diffused using the four error weightings.

12. The method of claim 1, wherein the plurality of colors comprises the first color, the second color, and at least a third color, the method further comprising:
prioritizing the first color ink, the second color ink, and the at least a third color ink when determining what color ink dot to print.

13. The method of claim 1, wherein the method is performed by printing system comprising an inkjet printer and a computer.

14. The method of claim 1, wherein no dots are printed if neither the combined tone from the first color and the second color is greater than the full intensity threshold for the pixel nor the combined tone and accumulated error from the first color and the second color is greater than the tone dependent threshold level.

15. The method of claim 1, wherein two dots are printed if the combined tone from the first color and the second color is greater than the full intensity threshold for the pixel and the combined tone and the accumulated error from the first color and the second color is greater than the tone dependent threshold level.

16. A printing system including a printer and a computer, the printing system performing a color halftone method which correlates multiple color planes to reduce a likelihood that printed dots of any color will be unintentionally overlapping and to provide printed dots with uniform placement, the method performed by the system comprising:
performing tone dependent error diffusion with a plurality of colors correlated to determine whether to print no dots, whether to print one dot of either a first color ink or a second color ink, and whether to print two dots including one dot of the first color ink and one dot of the second color ink in approximately the same position: and
correlating printing of dots of a first color with dots of a second color to reduce a likelihood that printed dots of the first color will unintentionally overlap printed dots of the second color,
wherein two dots are printed if a combined tone from the first color and the second color is greater than an intensity threshold for the pixel or the combined tone and the accumulated error from the first color and the second color is greater than the tone dependent threshold,
wherein one dot is printed if either the combined tone from the first color and the second color is greater than the intensity thershold for the pixel or the combined tone and the accumulated error from the first color and the second color is greater than the tone dependent threshold, and
wherein no dots are printed if neither the combined tone from the first color and the second color is greater than the intensity threshold for the pixel nor the combined tone and the accumulated error from the first color and the second color is greater than the tone dependent threshold.

17. The system of claim 16 wherein the printer is an inkjet printer.

18. The system of claim 16 further comprising a separate print cartridge for each color ink to be printed.

19. The system of claim 16, further comprising a print cartridge which prints black ink and at least one print cartridge which prints multiple color of ink.

20. A method of error diffusion halftoning to print an inkjet color image, the method comprising:

performing error diffusion with respect to tone of color to be rendered at a given pixel, including tone dependent, plane dependent error diffusion with a plurality of colors correlated to determine whether to print no dots, one dot of either at least a first color ink or at least a second color ink, or two dots at the same pixel, the performing error diffusion further including using combined tones of at least two color planes for determining threshold levels against which combined tones and accumulated errors for correlated color planes is compared, and using tone dependent error weightings based on said combined tones.

21. The method as set forth in claim 20, wherein the tone dependent error weightings are used to diffuse the final accumulated errors for each color plane.

* * * * *